US010181342B2

(12) United States Patent
Lo et al.

(10) Patent No.: US 10,181,342 B2
(45) Date of Patent: Jan. 15, 2019

(54) METHOD FOR IMPROVING A PROGRAM SPEED AND AN ERASE SPEED OF A MEMORY

(71) Applicant: eMemory Technology Inc., Hsin-Chu (TW)

(72) Inventors: Chun-Yuan Lo, Taipei (TW); Shih-Chen Wang, Taipei (TW); Wen-Hao Ching, Hsinchu County (TW); Chun-Chieh Chao, Hsinchu (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 15/802,474

(22) Filed: Nov. 3, 2017

(65) Prior Publication Data

US 2018/0315462 A1 Nov. 1, 2018

Related U.S. Application Data

(60) Provisional application No. 62/490,612, filed on Apr. 27, 2017.

(51) Int. Cl.
| | | |
|---|---|---|
| *G11C 7/22* | (2006.01) |
| *G11C 16/34* | (2006.01) |
| *G11C 29/44* | (2006.01) |
| G11C 16/06 | (2006.01) |
| G11C 16/14 | (2006.01) |
| G11C 16/10 | (2006.01) |

(52) U.S. Cl.
CPC .............. *G11C 7/22* (2013.01); *G11C 16/34* (2013.01); *G11C 29/44* (2013.01); G11C 16/06 (2013.01); G11C 16/10 (2013.01); G11C 16/14 (2013.01)

(58) Field of Classification Search
CPC ........... G11C 7/22; G11C 16/06; G11C 16/10; G11C 16/14; G11C 29/44
USPC ............ 365/189.07, 185.22, 185.24, 185.28, 365/185.29
See application file for complete search history.

(56) References Cited

U.S. PATENT DOCUMENTS

| | | | | | |
|---|---|---|---|---|---|
| 5,428,570 | A | * | 6/1995 | Iwahashi ................ | G11C 16/16 365/185.12 |
| 5,450,341 | A | * | 9/1995 | Sawada ............... | G11C 11/5621 365/184 |
| 5,475,249 | A | * | 12/1995 | Watsuji .................. | G11C 16/16 257/314 |
| 6,606,266 | B2 | * | 8/2003 | Tsuruda .............. | G11C 11/5642 365/185.03 |
| 7,808,833 | B2 | * | 10/2010 | Kux ....................... | G11C 16/10 365/185.24 |
| 8,472,256 | B2 | * | 6/2013 | Ruby ................... | G11C 11/5628 365/185.19 |
| 9,042,184 | B2 | * | 5/2015 | Ruby .................. | G11C 11/5628 365/185.22 |

* cited by examiner

*Primary Examiner* — Tan T. Nguyen
(74) *Attorney, Agent, or Firm* — Winston Hsu

(57) ABSTRACT

A method for improving a program speed of a memory includes acquiring a program level of the memory, comparing the program level of the memory with a valid level and a target level for generating a comparison result, and entering a first loop and/or a second loop for setting a program voltage of the memory according to the comparison result.

24 Claims, 11 Drawing Sheets

US 10,181,342 B2

METHOD FOR IMPROVING A PROGRAM SPEED AND AN ERASE SPEED OF A MEMORY

CROSS REFERENCE TO RELATED APPLICATIONS

This application claims the benefit of U.S. provisional application No. 62/490,612, filed Apr. 27, 2017.

BACKGROUND OF THE INVENTION

1. Field of the Invention

The present invention illustrates a method for improving performance of a memory, and more particularly, the method for improving a program speed and an erase speed of a non-volatile memory.

2. Description of the Prior Art

Non-volatile memory is a type of memory that retains information it stores even when no power is supplied to memory blocks. Some examples include magnetic devices, optical discs, flash memory, and other semiconductor-based memory topologies. Non-volatile memory can be categorized in electrically addressed systems (i.e., read-only memory) and mechanically addressed systems (i.e., hard disks, optical disc, magnetic tape, holographic memory, and such). Specifically, since non-volatile memory does not require its memory data to be periodically refreshed, it is commonly used for secondary storage or long-term consistent storage.

The non-volatile memory can perform a program operation, an erase operation, and a read operation for accessing data. Since the non-volatile memory can perform read operation and program operation, cycle count is increased over time. In conventional non-volatile memory, when the cycle count becomes large, oxide traps generated inside a gate oxide become severe. The oxide traps may cause degradation of an electric field, thereby decreasing an efficiency of the program operation and the erase operation. In other words, when the cycle count of the non-volatile memory becomes large, the program voltage is inefficient during the first few steps.

SUMMARY OF THE INVENTION

In an embodiment of the present invention, the method for improving a program speed of a memory is disclosed. The method comprises acquiring a program level of the memory, comparing the program level of the memory with a valid level and a target level for generating a comparison result, and entering a first loop and/or a second loop for setting a program voltage of the memory according to the comparison result. The target voltage is greater than the valid voltage. Entering the first loop for setting the program voltage comprises updating the program voltage in associate with a factor according to comparing the program level of the memory with the valid level. Entering the second loop for setting the program voltage comprises updating the program voltage in associate with the factor according to comparing the program level of the memory with the target level.

In another embodiment of the present invention, a method for improving an erase speed of a memory is disclosed. The method comprises acquiring an erase level of the memory, comparing the erase level of the memory with a valid level and a target level for generating a comparison result, and entering a first loop and/or a second loop for setting an erase voltage of the memory according to the comparison result. The target current is greater than the valid current. Entering the first loop for setting the erase voltage comprises updating the erase voltage in associate with a factor according to comparing the erase level of the memory with the valid level. Entering the second loop for setting the erase voltage comprises updating the erase level in associate with the factor according to comparing the erase level of the memory with the target level.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
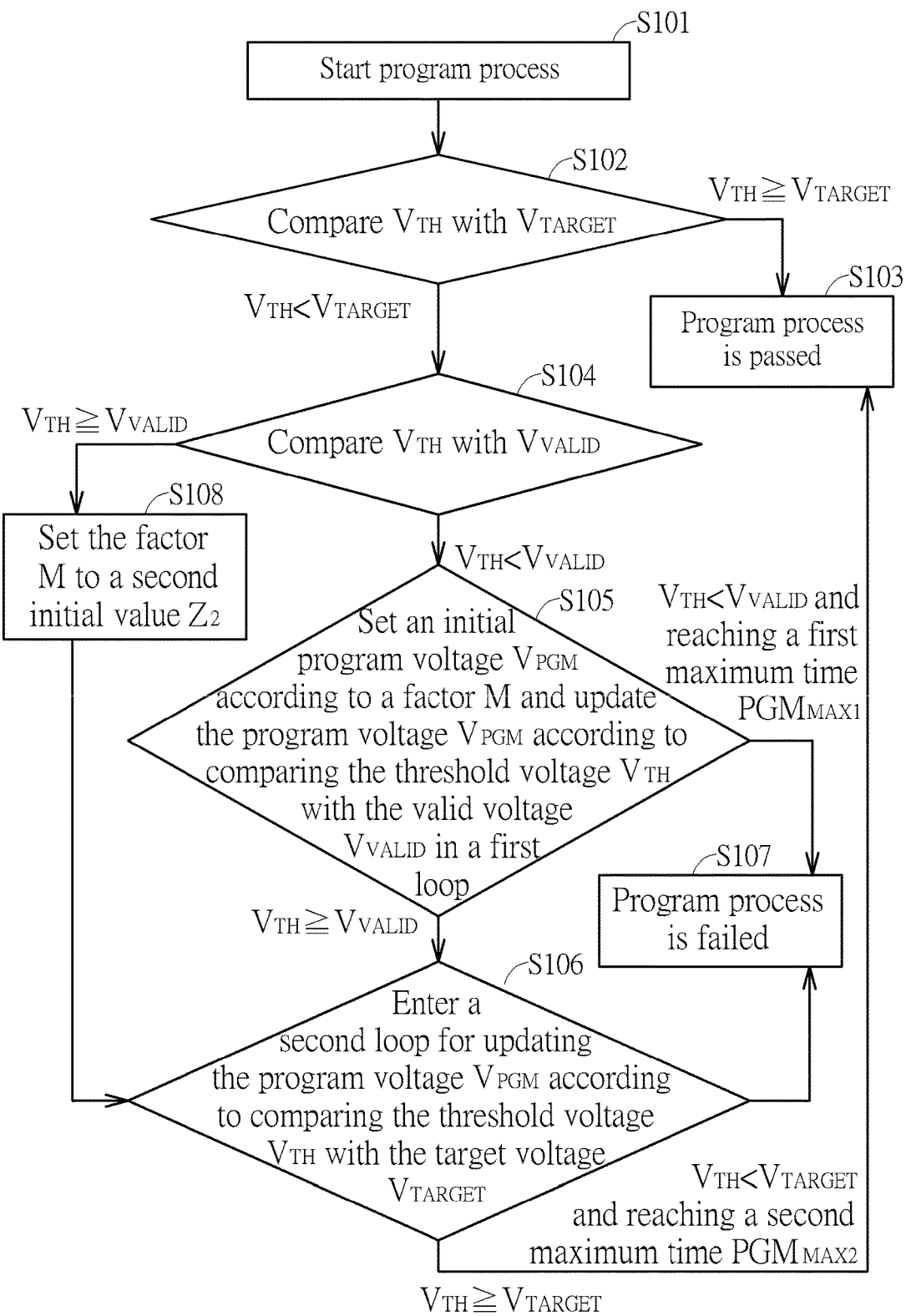
FIG. 1 illustrates a flow chart of a method for improving a program speed of a memory according to an embodiment of the present invention.

FIG. 1 illustrates a flow chart of a method for improving a program speed of a memory according to an embodiment of the present invention. The memory can be a non-volatile memory including a floating transistor. The method can include step S101 to step S108. Any reasonable modification in step S101 to step S108 of the method falls into the scope of the present invention. Particularly, denominations "a threshold voltage", "a target voltage", and "a valid voltage" are used in the embodiment of the present invention. However, the present invention can also use "a program level", "a valid level", and "a target level" for representing general denominations. In other words, "the program level", "the valid level", and "the target level" can be denoted as three voltage-based values or three current-based values. For simplicity, the voltage-based values (i.e., "the threshold voltage", "the valid voltage", and "the target voltage") are introduced for illustrating the following embodiments. Step S101 to step S108 are illustrated below.

step S101: start program process;

step S102: compare a threshold voltage $V_{TH}$ with a target voltage $V_{TARGET}$; if $V_{TH} \geq V_{TARGET}$, go to step S103; if $V_{TH} < V_{TARGET}$, go to step S104;

step S103: generate a program pass message.

step S104: compare the threshold voltage $V_{TH}$ with a valid voltage $V_{VALID}$; if $V_{TH}<V_{VALID}$, go to step S105; if $V_{TH}\geq V_{VALID}$, go to step S108;

step S105: enter a first loop for setting an initial program voltage $V_{PGM}$ according to a factor M (with a first initial value $Z_1$) and updating the program voltage $V_{PGM}$ according to comparing the threshold voltage $V_{TH}$ with the valid voltage $V_{VALID}$ in the first loop; if $V_{TH}\geq V_{VALID}$, go to step S106; if $V_{TH}<V_{VALID}$ and a first maximum time $PGM_{MAX1}$ has reached, go to step S107;

step S106: enter a second loop for updating the program voltage $V_{PGM}$ according to comparing the threshold voltage $V_{TH}$ with the target voltage $V_{TARGET}$ in the second loop, if $V_{TH}<V_{TARGET}$ and a second maximum time $PGM_{MAX2}$ has reached, go to step S107; if $V_{TH}\geq V_{TARGET}$, go to step S103;

step S107: generate a program failure message;

step S108: set the factor M with a second initial value $Z_2$, and go to step S106.

In step S101, the program process is started for performing a program operation. A threshold voltage $V_{TH}$ of the memory (i.e., the threshold voltage $V_{TH}$ associates with a floating transistor of the memory) can be acquired. A valid voltage $V_{VALID}$ and a target voltage $V_{TARGET}$ can be pre-determined. The target voltage $V_{TARGET}$ is greater than the valid voltage $V_{VALID}$. For example, the target voltage $V_{TARGET}$ can be equal to 1.6 volts. The valid voltage $V_{VALID}$ can be equal to 0.8 volts. In step S102, the threshold voltage $V_{TH}$ and the target voltage $V_{TARGET}$ is compared. If the threshold voltage $V_{TH}$ is greater than or equal to the target voltage $V_{TARGET}$ ($V_{TH}\geq V_{TARGET}$) it implies that the threshold voltage $V_{TH}$ is sufficient to pass the program operation. Thus, a program pass message can be generated in step S103. If the threshold voltage $V_{TH}$ is smaller than the target voltage $V_{TARGET}$ $V_{TH}<V_{TARGET}$) it implies that the threshold voltage $V_{TH}$ is insufficient to pass the program operation. Thus, in step S104, the threshold voltage $V_{TH}$ is further compared with the valid voltage $V_{VALID}$, which is lower than the target voltage $V_{TH}$. If the threshold voltage $V_{TH}$ is smaller than the valid voltage $V_{VALID}$, it implies that the program voltage $V_{PGM}$ must be ramped-up until the threshold voltage $V_{TH}$ reaches the target voltage $V_{TARGET}$ through the valid voltage $V_{VALID}$. Thus, in step S105, a first loop for increasing a program voltage $V_{PGM}$ according to a factor M (with a first initial value $Z_1$), the valid voltage $V_{VALID}$, and the threshold voltage $V_{TH}$ is performed. The threshold voltage $V_{TH}$ is compared with the valid voltage $V_{VALID}$ during the first loop. If the threshold voltage $V_{TH}$ is greater than or equal to the valid voltage $V_{VALID}$ ($V_{TH}\geq V_{VALID}$) step S106 is performed to further ramp-up the program voltage $V_{PGM}$ until the threshold voltage $V_{TH}$ reaches the target voltage $V_{TARGET}$. On the contrary, if the threshold voltage $V_{TH}$ is smaller than the valid voltage $V_{VALID}$ ($V_{TH}<V_{VALID}$) and the processing time of the first loop reaches the first maximum time $PGM_{MAX1}$, it implies that the program operation has failed. Thus, in step S107, a program failure message is generated.

As previously mentioned, when step S105 satisfies $V_{TH}\geq V_{VALID}$, step S106 is performed to further ramp-up the program voltage $V_{PGM}$. In step S106, a second loop for increasing the program voltage $V_{PGM}$ according to the target voltage $V_{TARGET}$ and the threshold voltage $V_{TH}$ is performed. The threshold voltage $V_{TH}$ is compared with the target voltage $V_{TARGET}$ during the second loop. If the threshold voltage $V_{TH}$ is greater than or equal to the target voltage $V_{TARGET}$ ($V_{TH}\geq V_{TARGET}$), it implies that the threshold voltage $V_{TH}$ is sufficient to pass the program operation. Thus, a program pass message can be generated in step S103. On the contrary, if the threshold voltage $V_{TH}$ is smaller than the target voltage $V_{TARGET}$ ($V_{TH}<V_{TARGET}$) and the processing time of the second loop has reached the second maximum time $PGM_{MAX2}$ it implies that the program operation has failed. Thus, in step S107, a program failure message is generated.

In the program process, when the threshold voltage $V_{TH}$ is between the voltage $V_{TARGET}$ and the valid voltage $V_{VALID}$, the threshold voltage $V_{TH}$ satisfies ($V_{TH}<V_{TARGET}$) in step S102 and ($V_{TH}\geq V_{VALID}$) in step S104. It implies that the program voltage $V_{PGM}$ must be ramped-up until the threshold voltage $V_{TH}$ reaches the target voltage $V_{TARGET}$. Because the threshold voltage $V_{TH}$ is already greater than or equal to the valid voltage ($V_{T}\geq V_{VALID}$), the second loop can be used for ramping-up the program voltage $V_{PGM}$ until the threshold voltage $V_{TH}$ reaches the target voltage $V_{TARGET}$. By doing so, step S108 can be executed for setting the factor M to a second initial value $Z_2$. Then, step S106 (second loop) can be executed for ramping-up the program voltage $V_{PGM}$.

Briefly, there are three cases to set the program voltage $V_{PGM}$. In the first case, if the threshold voltage $V_{TH}$ is greater than or equal to the target voltage $V_{TARGET}$ ($V_{TH}\geq V_{TARGET}$), the memory cell can be regarded as a cell which can pass the program operation. In the second case, if the threshold voltage $V_{TH}$ is between the valid voltage $V_{VALID}$ and the target voltage $V_{TARGET}$ ($V_{VALID}\leq V_{TH}<V_{TARGET}$), the program voltage $V_{PGM}$ has to be ramped-up by using the second loop until the threshold voltage $V_{TH}$ reaches the target voltage $V_{TARGET}$. In the third case, if the threshold voltage $V_{TH}$ is smaller than the valid voltage $V_{VALID}$ ($V_{TH}<V_{VALID}$), the program voltage $V_{PGM}$ has to be ramped-up by using the first loop and the second loop until the threshold voltage $V_{TH}$ reaches the target voltage $V_{TARGET}$. Further, limitation of the processing time is also introduced to the first loop and the second loop. For example, when the processing time of the first loop reaches the first maximum time $PGM_{MAX1}$ or the processing time of the second loop reaches the second maximum time $PGM_{MAX2}$, the program failure message is generated. Here, the first maximum time $PGM_{MAX1}$ and the second maximum time $PGM_{MAX2}$ can be two identical values or two distinct values. Once the threshold voltage $V_{TH}$ reaches the target voltage $V_{TARGET}$, the program pass message can be generated. In the following, a flow chart of step S105 corresponding to the first loop and a flow chart of step S106 corresponding to the second loop are described.

Figure 2:
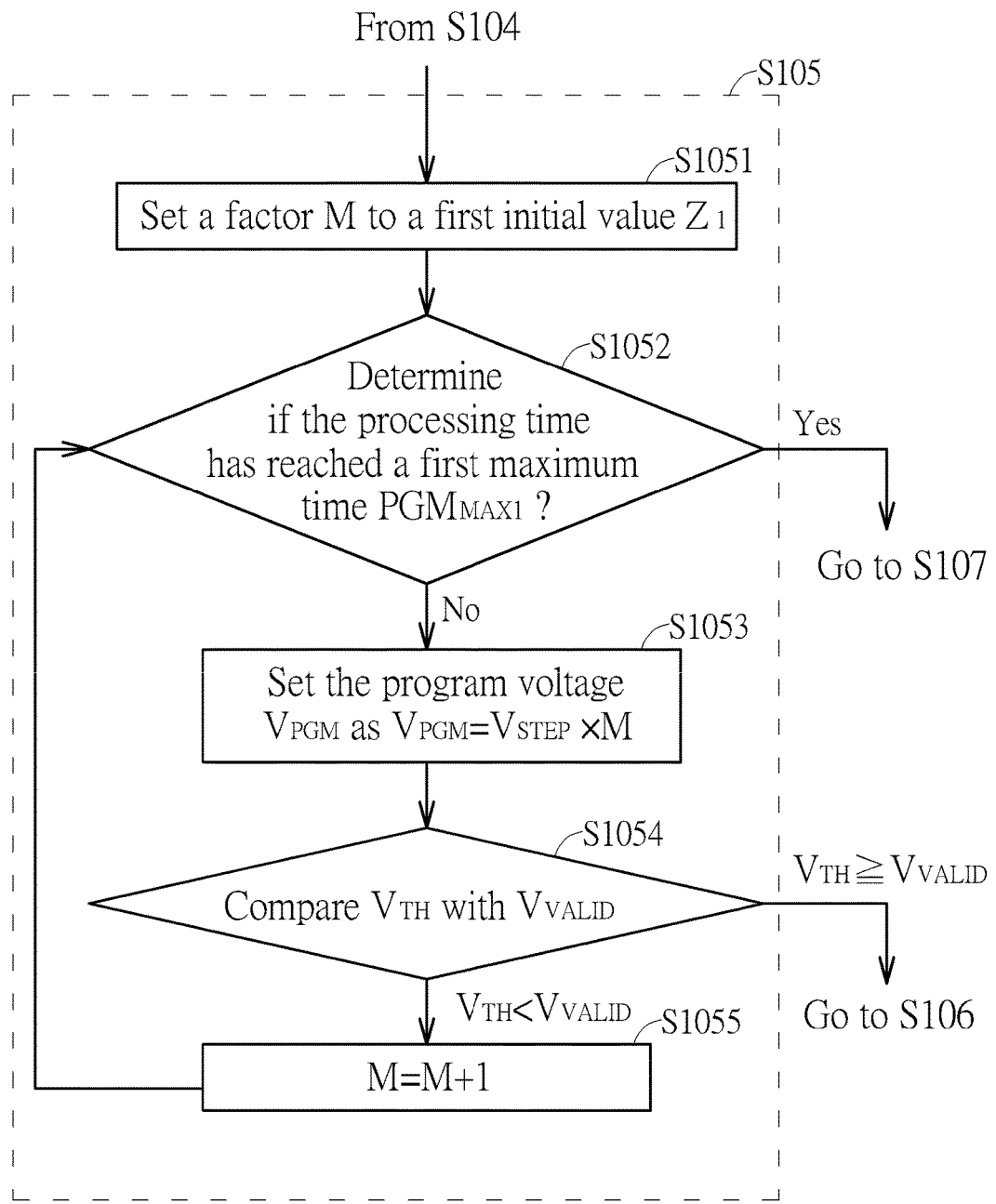
FIG. 2 illustrates a flow chart of step S105 in FIG. 1.

FIG. 2 illustrates a flow chart of step S105. Step S105 can be regarded as a step of performing the first loop. The first loop includes step S1051 to S1055. Any reasonable modification of step S1051 to step S1055 falls into the scope of the present invention. S1051 to step S1055 are illustrated below.

step S1051: set a factor M equal to a first initial value $Z_1$;

step S1052: determine if the processing time has reached a first maximum time $PGM_{MAX1}$; if the processing time has reached the first maximum time $PGM_{MAX1}$, go to step S107, else go to step S1053;

step S1053: multiply a constant voltage $V_{STEP}$ by the factor M for generating the program voltage $V_{PGM}$;

step S1054: compare the threshold voltage $V_{TH}$ with the valid voltage $V_{VALID}$; if $V_{TH}\geq V_{VALID}$, go to step S106; if $V_{TH}<V_{VALID}$, go to step S1055;

step S1055: increment the factor M and go to step S1052.

In step S1051, the factor M can be set to equal to the first initial value $Z_1$. For example, the first initial value $Z_1$ can be 12 so that M=12 can be regarded as an initial factor of the first loop. Specifically, the first initial value $Z_1$ can be determined before the step S105 is executed. Further, the first initial value $Z_1$ can be adjusted according to the valid voltage $V_{VALID}$. In step S1052, the processing time of the first loop is compared with the first maximum time $PGM_{MAX1}$. If the processing time has reached the first maximum time $PGM_{MAX1}$, the program failure message is generated in step S107. If the processing time is smaller than the first maximum time $PGM_{MAX1}$, step S1053 is executed. In step S1053, the program voltage $V_{PGM}$ can be generated by multiplying a constant voltage $V_{STEP}$ by the factor M (i.e., $V_{PGM}=V_{STEP}\times M$). After the program voltage $V_{PGM}$ is generated, the threshold voltage $V_{TH}$ is compared with the valid voltage $V_{VALID}$ in step S1054. If the threshold voltage $V_{TH}$ is greater than or equal to the valid voltage $V_{VALID}$ ($V_{TH} \geq V_{VALID}$), step S106 is executed. If the threshold voltage $V_{TH}$ is smaller than the valid voltage $V_{VALID}$ ($V_{TH} < V_{VALID}$), it implies that the program voltage $V_{PGM}$ is still insufficient. Thus, in step S1055, the factor M can be incremented (i.e., for example, M can be increased by one) so that the program voltage $V_{PGM}=V_{STEP}\times M$ generated again can be increased. Here, the constant voltage $V_{STEP}$ can be equal to 1.2 volts, which is between the valid voltage $V_{VALID}$ and the target voltage $V_{TARGET}$. Any reasonable parameter modification falls into the scope of the present invention.

Figure 3:
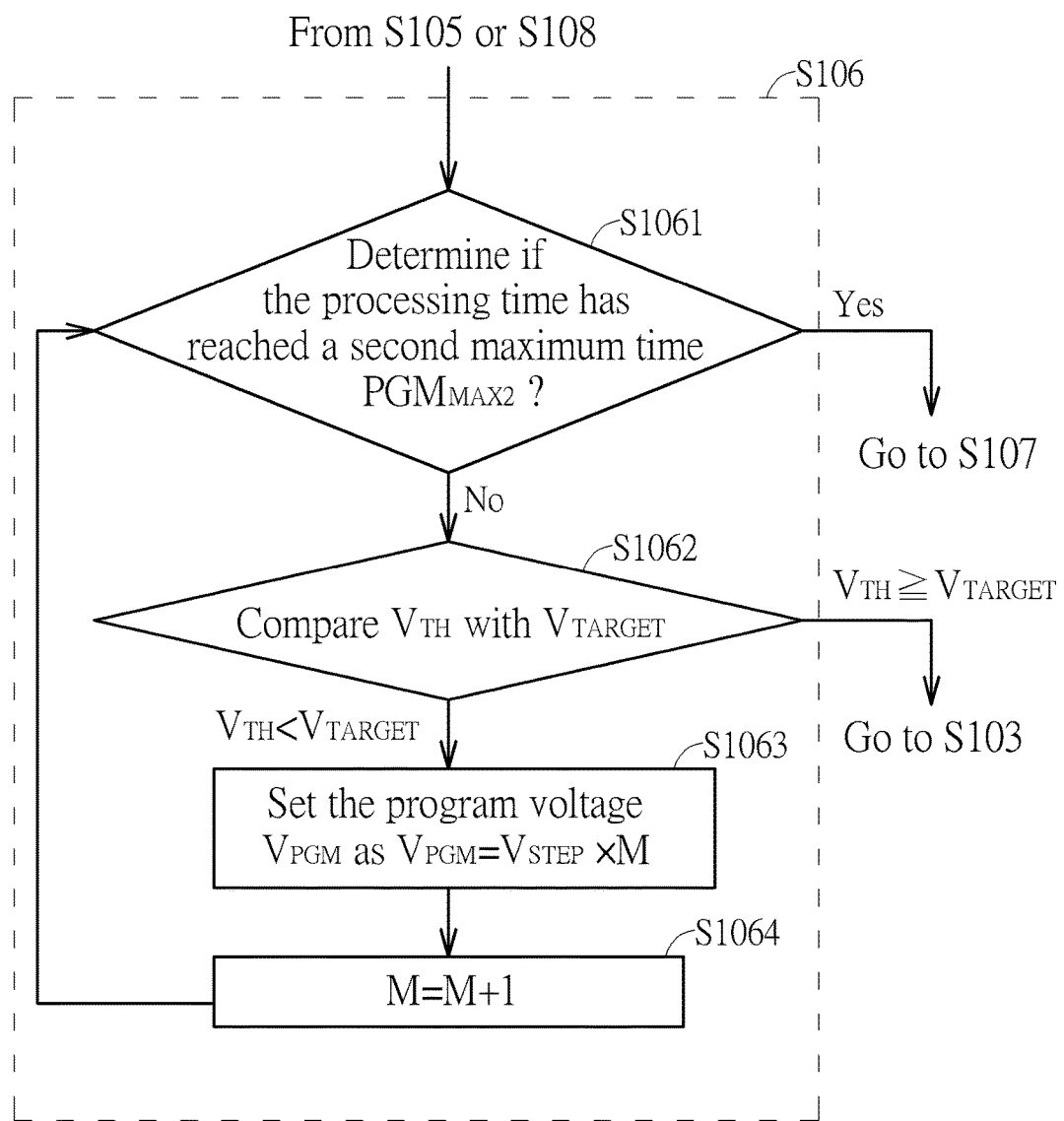
FIG. 3 illustrates a flow chart of step S106 in FIG. 1.

FIG. 3 illustrates a flow chart of step S106. Step S106 can be regarded as a step of performing the second loop. The second loop includes step S1061 to S1064. Any reasonable modification of step S1061 to step S1064 falls into the scope of the present invention. S1061 to step S1064 are illustrated below.

step S1061: determine if the processing time has reached a second maximum time $PGM_{MAX2}$; if the processing time has reached the second maximum time $PGM_{MAX2}$, go to step S107, else go to step S1062;

step S1062: compare the threshold voltage $V_{TH}$ with the target voltage $V_{TARGET}$; if $V_{TH} \geq V_{TARGET}$, go to step S103; if $V_{TH} < V_{TARGET}$, go to step S1063;

step S1063: multiply a constant voltage $V_{STEP}$ by a factor M for generating the program voltage $V_{PGM}$;

step S1064: increment the factor M and go to step S1061.

In step S1061, the processing time of the second loop is compared with the second maximum time $PGM_{MAX2}$. If the processing time has reached the second maximum time $PGM_{MAX2}$, the program failure message is generated in step S107. If the processing time is smaller than the second maximum time $PGM_{MAX2}$, step S1062 is executed. In step S1062, the threshold voltage $V_{TH}$ is compared with the target voltage $V_{TARGET}$. If $V_{TH} \geq V_{TARGET}$ holds, step S103 is executed. If $V_{TH} < V_{TARGET}$ holds, step S1063 is executed. In step S1063, the program voltage $V_{PGM}$ can be generated by multiplying a constant voltage $V_{STEP}$ by the factor M (i.e., $V_{PGM}=V_{STEP}\times M$). Here, as previously mentioned, the factor M can be a variable inherited from step S105. The factor M can be a variable equal to the second initial value $Z_2$ determined in step S108. However, steps S1062 and step S1063 can be exchanged. For example, after the program voltage $V_{PGM}$ is generated, the threshold voltage $V_{TH}$ is compared with the target voltage $V_{TARGET}$. If the threshold voltage $V_{TH}$ is greater than or equal to the target voltage $V_{TARGET}$ ($V_{TH} \geq V_{TARGET}$), step S103 is executed. If the threshold voltage $V_{TH}$ is smaller than the target voltage $V_{TARGET}$ ($V_{TH} < V_{TARGET}$), it implies that the program voltage $V_{PGM}$ is still insufficient. Thus, in step S1064, the factor M can be incremented (i.e., for example, M can be increased by one) so that the program voltage $V_{PGM}=V_{STEP}\times M$ generated again can be also increased. Any reasonable modification or changing a processing sequence of steps S1062 and S1063 falls into the scope of the present invention. Here, the constant voltage $V_{STEP}$ can be equal to 1.2 volts, which is between the valid voltage $V_{VALID}$ and the target voltage $V_{TARGET}$. Any reasonable parameter modification falls into the scope of the present invention.

Figure 4:
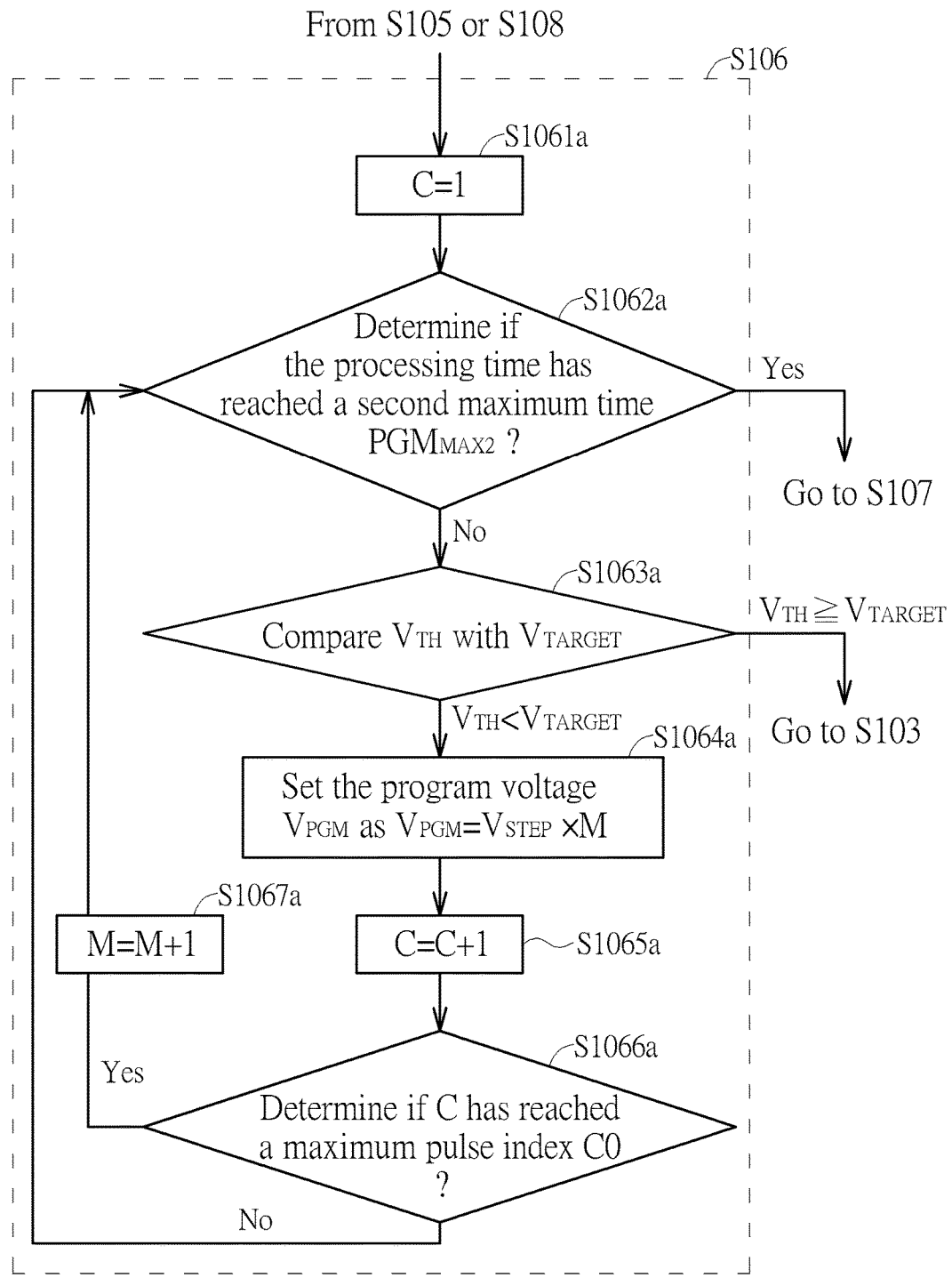
FIG. 4 illustrates another flow chart of step S106 in FIG. 1.

FIG. 4 illustrates another flow chart of Step S106. In FIG. 4, an additional dummy variable C is introduced (hereafter, say, "program pulse index C") for applying to multi-program pulses. Step S106 can be regarded as a step of performing the second loop. The second loop includes step S1061a to S1067a. Any reasonable modification of step S1061a to step S1067a falls into the scope of the present invention. S1061a to step S1067a are illustrated below.

step S1061a: set a program pulse index C and its initial value;

step S1062a: determine if the processing time has reached a second maximum time $PGM_{MAX2}$; if the processing time has reached the second maximum time $PGM_{MAX2}$, go to step S107, else go to step S1063a;

step S1063a: compare the threshold voltage $V_{TH}$ with the target voltage $V_{TARGET}$; if $V_{TH} \geq V_{TARGET}$, go to step S103; if $V_{TH} < V_{TARGET}$, go to step S1064a;

step S1064a: multiply a constant voltage $V_{STEP}$ by a factor M for generating the program voltage $V_{PGM}$;

step S1065a: increment the program pulse index C;

step S1066a: determine if the program pulse index C has reached a maximum pulse index C0; if the program pulse index C has reached the maximum pulse index C0, go to step S1067a; else go to step S1062a;

step S1067a: increment the factor M and go to step S1062a.

In step S1061a, the program pulse index C and its initial value are determined. Here, the program voltage $V_{PGM}$ can be a voltage of an envelope of program pulses (i.e., program pulse index C=1 to C=C0). Thus, the second loop can be regarded as a multi-pulse loop process. The initial value of the program pulse index C can be equal to one. In step S1062a, the processing time of the second loop is compared with the second maximum time $PGM_{MAX2}$. If the processing time has reached the second maximum time $PGM_{MAX2}$, the program failure message is generated in step S107. If the processing time is smaller than the second maximum time $PGM_{MAX2}$, step S1063a is executed. In step S1063a, the threshold voltage $V_{TH}$ is compared with the target voltage $V_{TARGET}$. If $V_{TH} \geq V_{TARGET}$ holds, step S103 is executed. If $V_{TH} < V_{TARGET}$ holds, step S1064a is executed. In step S1064a, the program voltage $V_{PGM}$ can be generated by multiplying a constant voltage $V_{STEP}$ by the factor M (i.e., $V_{PGM}=V_{STEP}\times M$) corresponding to a program pulse at a current program pulse index C. Here, as previously mentioned, the factor M can be a variable inherited by step S105. The factor M can be a variable equal to the second initial value $Z_2$ determined in step S108. However, steps S1063a and step S1064a can be exchanged. For example, after the program voltage $V_{PGM}$ is generated, the threshold voltage $V_{TH}$ is compared with the target voltage $V_{TARGET}$. If the threshold voltage $V_{TH}$ is greater than or equal to the target voltage $V_{TARGET}$ ($V_T \geq V_{TARGET}$), step S103 is executed. Any reasonable modification or changing a processing sequence of steps S1063a and S1064a falls into the scope of the present invention. If the threshold voltage $V_{TH}$ is smaller than the target voltage $V_{TARGET}$ ($V_{TH} < V_{TARGET}$), the program pulse index C can be incremented (i.e., for example, C can be increased by one) in step S1065a. In step S1066a, the program pulse index C is compared with the maximum pulse index C0. If the program pulse index C has reached the maximum pulse index C0, the factor M is incremented in step S1067a. Then, step S1062a is executed again. If the program pulse index C is smaller than the maximum pulse index C0, step S1062a is executed again.

In FIG. 4, the program voltage $V_{PGM}$ can be a voltage of an envelope of program pulses (i.e., program pulse index C=1 to index C=C0). For example, the program voltage $V_{PGM}$ can be a voltage of an envelope of 10 program pulses (i.e., C0=10). The threshold voltage $V_{TH}$ can be compared with the target voltage $V_{TARGET}$ after each program pulse is generated. However, the threshold voltage $V_{TH}$ can also be compared with the target voltage $V_{TARGET}$ after consecutive C0 program pulses are generated. When the threshold voltage $V_{TH}$ is greater than the target voltage $V_{TARGET}$, the second loop of step S106 is completed. The program operation is passed.

Figure 5:
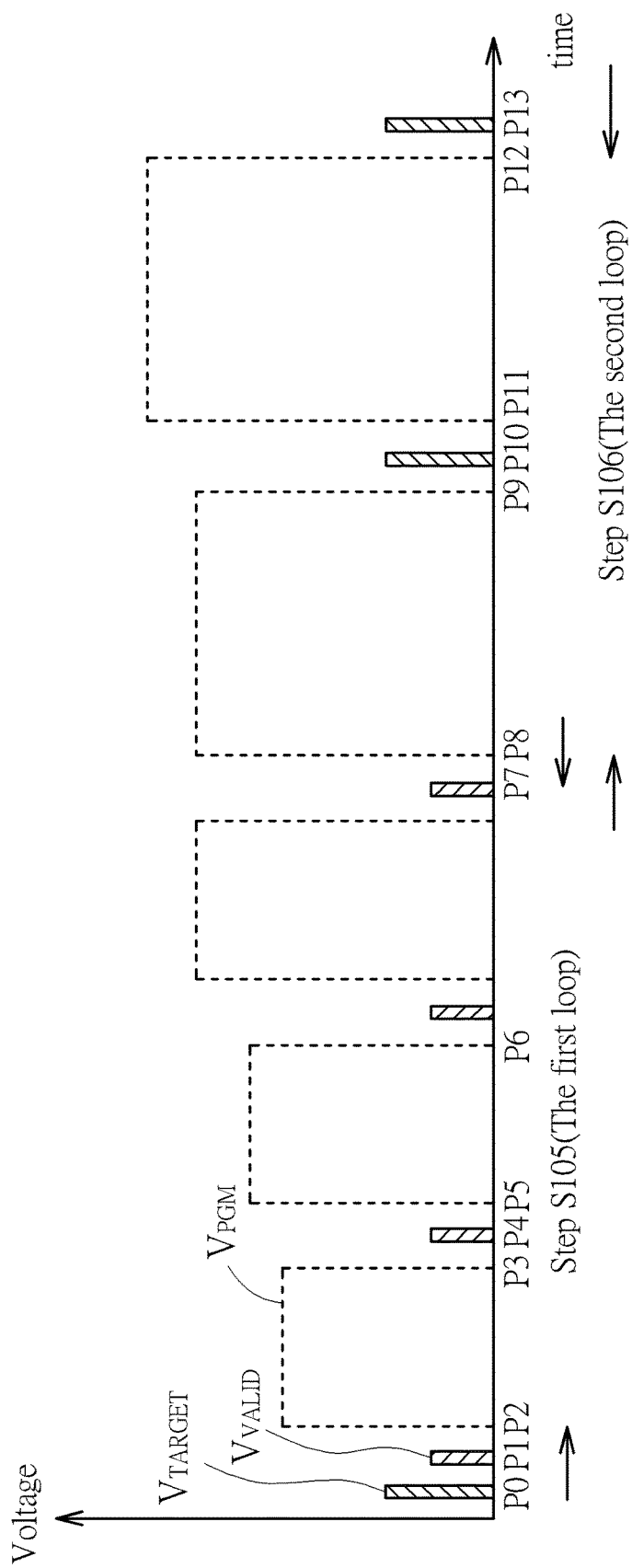
FIG. 5 illustrates a target voltage, a valid voltage and a program voltage corresponding to a voltage of a single broad pulse of the method in FIG. 1.

FIG. 5 illustrates a target voltage $V_{TARGET}$, a valid voltage $V_{VALID}$ and a program voltage $V_{PGM}$ corresponding to a voltage of a single broad pulse. As previously mentioned, the program voltage $V_{PGM}$ can be a step waveform. Thus, the program voltage $V_{PGM}$ can be defined as a voltage of any ramp or step-function based signal. For example, in FIG. 5, the program voltage $V_{PGM}$ can be the voltage of the single broad pulse. X-axis is denoted as a time line. Y-axis is denoted as a voltage intensity scale. FIG. 5 can be regarded as a general case including step S101, step S102, step S104, step S105, and step S106. After the program process is started, the valid voltage $V_{VALID}$ and the target voltage $V_{TARGET}$ are determined. Then, the threshold voltage $V_{TH}$ is compared with the target voltage $V_{TARGET}$ at time point P0. If the threshold voltage $V_{TH}$ is smaller than the target voltage $V_{TARGET}$ ($V_{TH}<V_{TARGET}$), the threshold voltage $V_{TH}$ is further compared with the valid voltage $V_{VALID}$ at time point P1. If the threshold voltage $V_{TH}$ is smaller than the valid voltage $V_{VALID}$ ($V_{TH}<V_{VALID}$), the first loop is executed. The program voltage $V_{PGM}$ of a broad pulse between time points P2 and P3 is generated by $V_{PGM}=V_{STEP} \times M$ for $M=Z_1$. The threshold voltage $V_{TH}$ is compared with the valid voltage $V_{VALID}$ at time point P4. If the threshold voltage $V_{TH}$ is smaller than the valid voltage $V_{VALID}$ ($V_{TH}<V_{VALID}$), the program voltage $V_{PGM}$ of a broad pulse between time points P5 and P6 is generated by $V_{PGM}=V_{STEP} \times M$ for $M=(Z_1+1)$, and so on. The threshold voltage $V_{TH}$ is compared with the valid voltage $V_{VALID}$ at time point P7. If the threshold voltage $V_{TH}$ is greater than or equal to the valid voltage $V_{VALID}$ ($V_{TH} \geq V_{VALID}$), the second loop is executed. Then, the program voltage $V_{PGM}$ of a broad pulse between time points P8 and P9 is generated by $V_{PGM}=V_{STEP} \times M$ for $M=Z_2$, where $Z_2$ can be a value inherited from the first loop. The threshold voltage $V_{TH}$ is compared with the target voltage $V_{TARGET}$ at time point P10. If the threshold voltage $V_{TH}$ is smaller than the target voltage $V_{TARGET}$ ($V_{TH}<V_{TARGET}$), the program voltage $V_{PGM}$ of a broad pulse between time points P11 and P12 is generated by $V_{PGM}=V_{STEP} \times M$ for $M=(Z_2+1)$. Finally, the threshold voltage $V_{TH}$ is compared with the target voltage $V_{TARGET}$ at time point P13. If the threshold voltage $V_{TH}$ is greater than or equal to the target voltage $V_{TARGET}$ ($V_{TH} \geq V_{TARGET}$), the program operation is passed.

Figure 6:
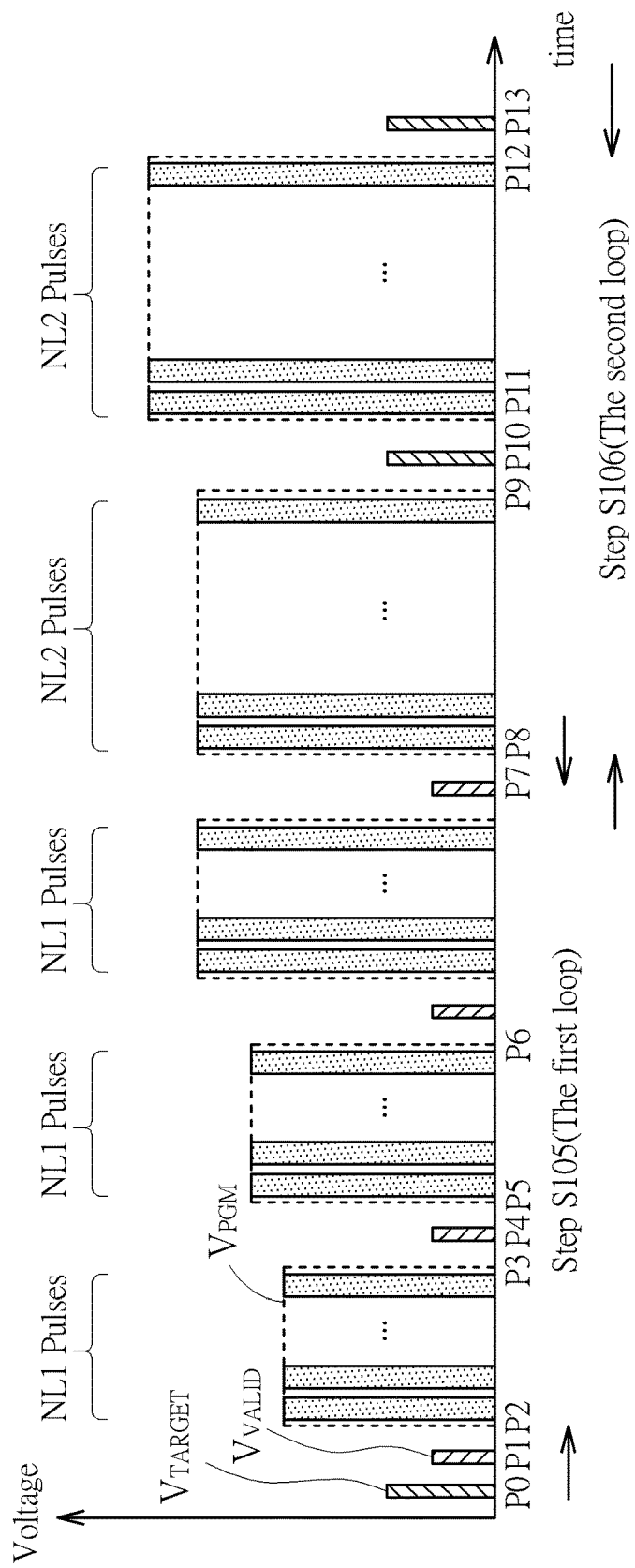
FIG. 6 illustrates a target voltage, a valid voltage and a program voltage corresponding to an envelope of program pulses of the method in FIG. 1.

FIG. 6 illustrates the target voltage $V_{TARGET}$, the valid voltage $V_{VALID}$ and the program voltage $V_{PGM}$ corresponding to an envelope of program pulses. Operations in FIG. 6 are similar to operations in FIG. 5. Specifically, the program voltage $V_{PGM}$ in FIG. 6 can be an envelope of program pulses. For example, NL1 program pulses (i.e., NL1 can be equal to 3) can be introduced to form an envelope corresponding to the program voltage $V_{PGM}$ in the first loop. NL2 program pulses (i.e., NL2 can be equal to 10) can be introduced to form an envelope corresponding to the program voltage $V_{PGM}$ in the second loop.

Figure 7:
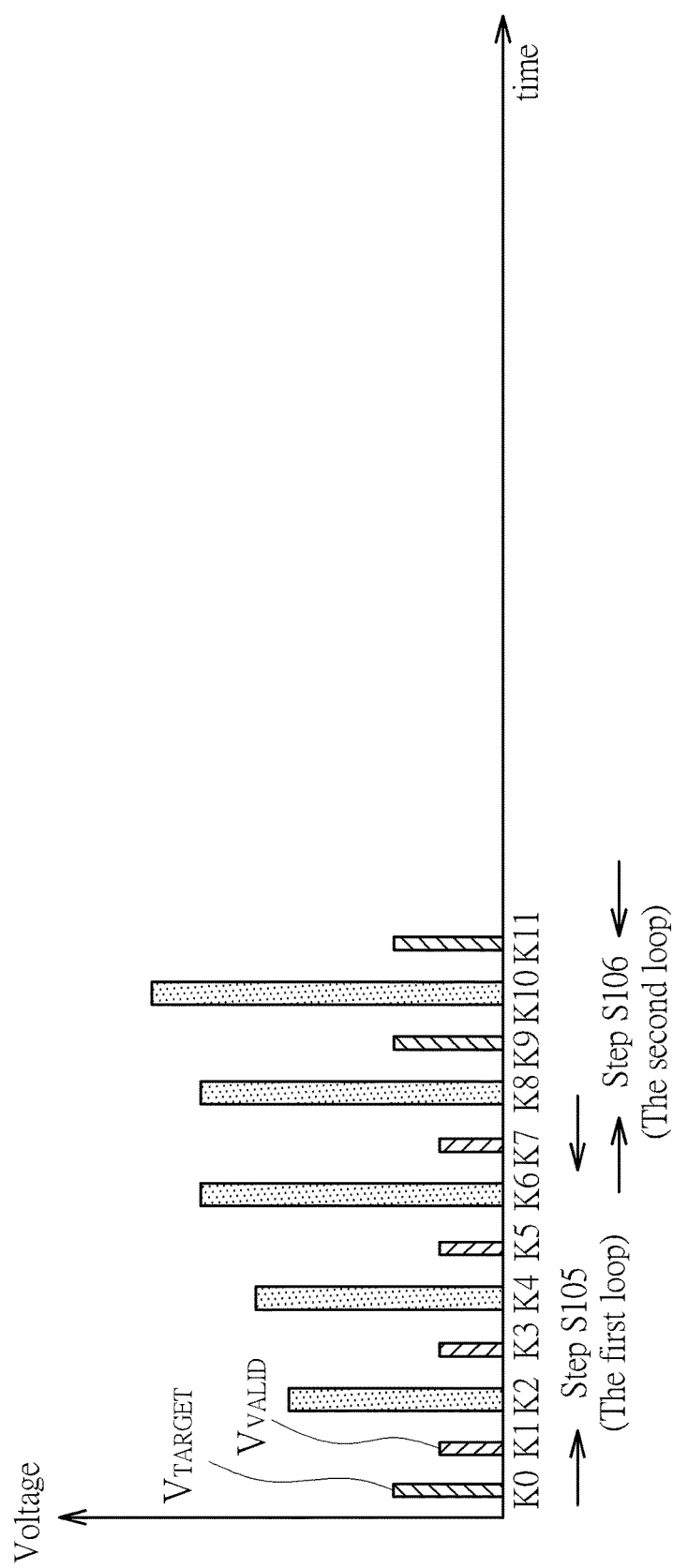
FIG. 7 illustrates a target voltage, a valid voltage and a program voltage corresponding to a voltage of a single narrow pulse of the method in FIG. 1.

FIG. 7 illustrates the target voltage $V_{TARGET}$, the valid voltage $V_{VALID}$ and the program voltage $V_{PGM}$ corresponding to a voltage of a single narrow pulse. X-axis is denoted as a time line. Y-axis is denoted as a voltage intensity scale. Similarly, after the program process is started, the valid voltage $V_{VALID}$ and the target voltage $V_{TARGET}$ are determined. Then, the threshold voltage $V_{TH}$ is compared with the target voltage $V_{TARGET}$ at time point K0. If the threshold voltage $V_{TH}$ is smaller than the target voltage $V_{TARGET}$ ($V_{TH}<V_{TARGET}$), the threshold voltage $V_{TH}$ is compared with the valid voltage $V_{VALID}$ at time point K1. If the threshold voltage $V_{TH}$ is smaller than the valid voltage $V_{VALID}$ ($V_{TH}<V_{VALID}$), the first loop is executed. The program voltage $V_{PGM}$ of a narrow pulse at time point K2 is generated by $V_{PGM}=V_{STEP} \times M$ for $M=Z_1$. The threshold voltage $V_{TH}$ is compared with the valid voltage $V_{VALID}$ at time point K3. If the threshold voltage $V_{TH}$ is smaller than the valid voltage $V_{VALID}$ ($V_{TH}<V_{VALID}$), the program voltage $V_{PGM}$ of a narrow pulse at time point K4 is generated by $V_{PGM}=V_{STEP} \times M$ for $M=(Z_1+1)$, and so on. The threshold voltage $V_{TH}$ is compared with the valid voltage $V_{VALID}$ at time point K7. If the threshold voltage $V_{TH}$ is greater than or equal to the valid voltage $V_{VALID}$ ($V_{TH} \geq V_{VALID}$), the second loop is executed. Then, the program voltage $V_{PGM}$ of a narrow pulse at time point K8 is generated by $V_{PGM}=V_{STEP} \times M$ for $M=Z_2$, where $Z_2$ can be a value inherited from the first loop. The threshold voltage $V_{TH}$ is compared with the target voltage $V_{TARGET}$ at time point P9. If the threshold voltage $V_{TH}$ is smaller than the target voltage $V_{TARGET}$ ($V_{TH}<V_{TARGET}$) the program voltage $V_{PGM}$ of a narrow pulse at time point K10 is generated by $V_{PGM}=V_{STEP} \times M$ for $M=(Z_2+1)$. Finally, the threshold voltage $V_{TH}$ is compared with the target voltage $V_{TARGET}$ at time point K11. If the threshold voltage $V_{TH}$ is greater than or equal to the target voltage $V_{TARGET}$ ($V_{TH} \geq V_{TARGET}$) the program operation is passed.

In an embodiment, the threshold voltage $V_{TH}$ is initially between the target voltage $V_{TARGET}$ and the valid voltage $V_{VALID}$ ($V_{VALID} \geq V_{TH}<V_{TARGET}$) After the threshold voltage $V_{TH}$ is compared with the target voltage $V_{TARGET}$ and the valid voltage $V_{VALID}$, the threshold voltage $V_{TH}$ satisfies $V_{VALID} \leq V_{TH}$ and $V_{TH}<V_{TARGET}$. Here, since the threshold voltage $V_{TH}$ satisfies $V_{VALID} \leq V_{TH}$, the step S105 (i.e., entering the first loop) in FIG. 1 can be omitted. Further, the step S106 (i.e., entering the second loop) in FIG. 1 is executed. For example, in FIG. 5 and FIG. 6, after the threshold voltage $V_{TH}$ is compared with the target voltage $V_{TARGET}$ at time point P0 and the valid voltage $V_{VALID}$ at time point P1, the first loop during the time point P2 to the time point P7 can be omitted since $V_{VALID} \leq V_{TH}$ holds. Further, the second loop during the time point P8 to the time point P13 is executed. Similarly, in FIG. 7, after the threshold voltage $V_{TH}$ is compared with the target voltage $V_{TARGET}$ at time point K0 and the valid voltage $V_{VALID}$ at time point K1, the first loop during the time point K2 to the time point K7 can be omitted since $V_{VALID} \leq V_{TH}$ holds. Further, the second loop during the time point K8 to the time point K11 is executed. In other words, when the threshold voltage $V_{TH}$ is detected between the target voltage $V_{TARGET}$ and the valid voltage $V_{VALID}$, only the second loop is required for updating the program voltage $V_{PGM}$.

In the method for improving the program speed previously mentioned, two different voltages are used for quickly ramping-up the program voltage $V_{PGM}$. In the embodiment, the valid voltage $V_{VALID}$ and the target voltage $V_{TARGET}$ can be regarded as two boundaries for detecting a range of the threshold voltage $V_{TH}$. When the threshold voltage $V_{TH}$ falls into a range of ($V_{TH} < V_{VALID}$) or ($V_{VALID} \leq V_{TH} < V_{TARGET}$), the program voltage $V_{PGM}$ is ramped-up until the threshold voltage $V_{TH}$ satisfies $V_{TH} \geq V_{TARGET}$. Thus, the program speed can be improved.

As previously mentioned, the aforementioned embodiments use the voltage-based comparison method for improving the program speed of the memory. However, the current-based comparison method for improving the program speed of the memory can also be used in the present invention. When the current-based comparison method is used, "the program level", "the valid level", and "the target level" can be regarded as "a cell current", "a valid current", and "a target current". Specifically, the target current is smaller than the valid current. When the program voltage $V_{PGM}$ is increased, the cell current becomes small. Thus, in the current-based comparison method, the valid current and the target current can be regarded as two boundaries for detecting a range of the cell current. When the cell current is greater than the valid current or between the valid current and the target current, the program voltage $V_{PGM}$ is ramped-up until the cell current is smaller than or equal to the target current. Thus, the program speed can be improved.

Figure 8:
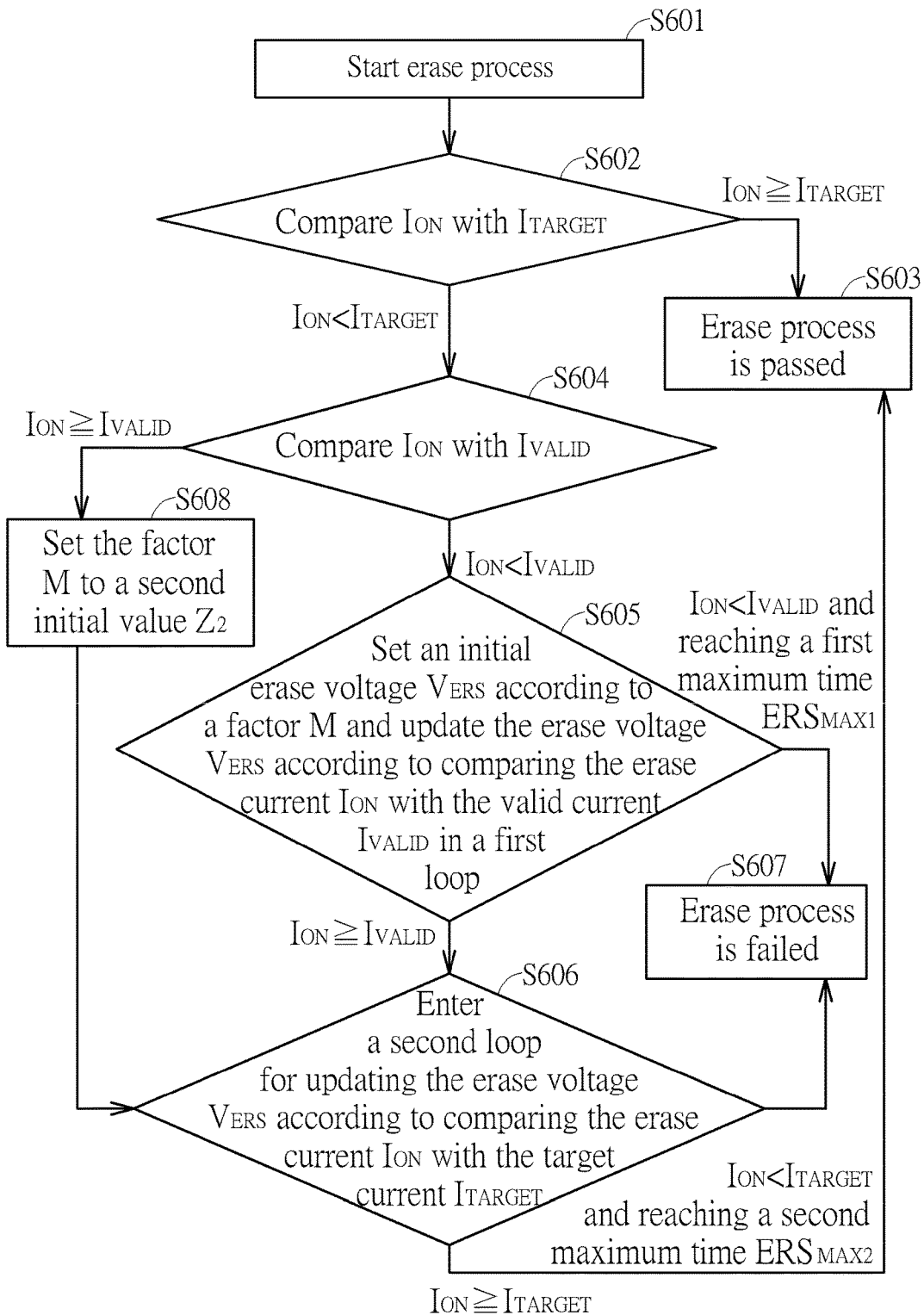
FIG. 8 illustrates a flow chart of a method for improving an erase speed of a memory according to an embodiment of the present invention.

FIG. 8 illustrates a flow chart of a method for improving an erase speed of a memory according to an embodiment of the present invention. The method for improving the erase speed of the memory is similar to the method for improving the program speed of the memory illustrated in FIG. 1 by replacing the threshold voltage $V_{TH}$ with an erase current $I_{ON}$, by replacing the target voltage $V_{TARGET}$ with a target current $I_{TARGET}$, by replacing the valid voltage $V_{VALID}$ with a valid current $I_{VALID}$. The method can include step S601 to step S608. Any reasonable modification in step S601 to step S608 of the method falls into the scope of the present invention. Particularly, denominations "the erase current", "the valid current", and "the target current" are used in the embodiment of the present invention. However, the present invention can also use "an erase level", "a valid level", and "a target level" for representing general denominations. In other words, "the erase level", "the valid level", and "the target level" can be denoted as three voltage-based values or three current-based values. For simplicity, the current-based values (i.e., "the erase current", "the valid current", and "the target current") are introduced for illustrating the following embodiments. S601 to step S608 are illustrated below.

step S601: start an erase process;
step S602: compare an erase current $I_{ON}$ with a target current $I_{TARGET}$; if $I_{ON} \geq I_{TARGET}$, go to step S603; if $I_{ON} < I_{TARGET}$, go to step S604;
step S603: generate an erase pass message.
step S604: compare the erase current $I_{ON}$ with a valid current $I_{VALID}$; if $I_{ON} < I_{VALID}$, go to step S605; if $I_{ON} \geq I_{VALID}$, go to step S608;
step S605: enter a first loop for setting an initial erase voltage $V_{ERS}$ according to a factor M (with a first initial value $Z_1$) and updating the erase voltage $V_{ERS}$ according to comparing the erase current $I_{ON}$ with the valid current $I_{VALID}$ in the first loop; if $I_{ON} \geq I_{VALID}$, go to step S606; if $I_{ON} < I_{VALID}$ and a first maximum time $ERS_{MAX1}$ has reached, go to step S607;
step S606: enter a second loop for updating the erase voltage $V_{ERS}$ according to comparing the erase current $I_{ON}$ with the target current $I_{TARGET}$ in the second loop; if $I_{ON} < I_{TARGET}$ and a second maximum time $ERS_{MAX2}$ has reached, go to step S607; if $I_{ON} \geq I_{TARGET}$, go to step S603;

step S607: generate an erase failure message;
step S608: set the factor M with a second initial value $Z_2$, and go to step S606.

Similarly, if the erase current $I_{ON}$ is greater than or equal to the target current $I_{TARGET}$ ($I_{ON} \geq I_{TARGET}$), the memory cell can be regarded as a cell which can pass the erase operation. If the erase current $I_{ON}$ is between the valid current $I_{VALID}$ and the target current $I_{TARGET}$ ($I_{VALID} \leq I_{ON} < I_{TARGET}$) the erase voltage $V_{ERS}$ has to be ramped-up by using the second loop until the erase current $I_{ON}$ reaches the target current $I_{TARGET}$. If the erase current $I_{ON}$ is smaller than the valid current $I_{VALID}$ ($I_{ON} < I_{VALID}$), the erase voltage $V_{ERS}$ has to be ramped-up by using the first loop and the second loop until the erase current $I_{ON}$ reaches the target current $I_{TARGET}$. Further, limitation of a processing time is also introduced to the first loop and the second loop. For example, when the first loop reaches the first maximum time $ERS_{MAX1}$ or the second loop reaches the second maximum time $ERS_{MAX2}$, the erase failure message is generated. Here, the first maximum time $ERS_{MAX1}$ and the second maximum time $ERS_{MAX2}$ can be two identical values or two distinct values. Once the erase current $I_{ON}$ reaches the target current $I_{TARGET}$, the erase pass message can be generated.

Figure 9:
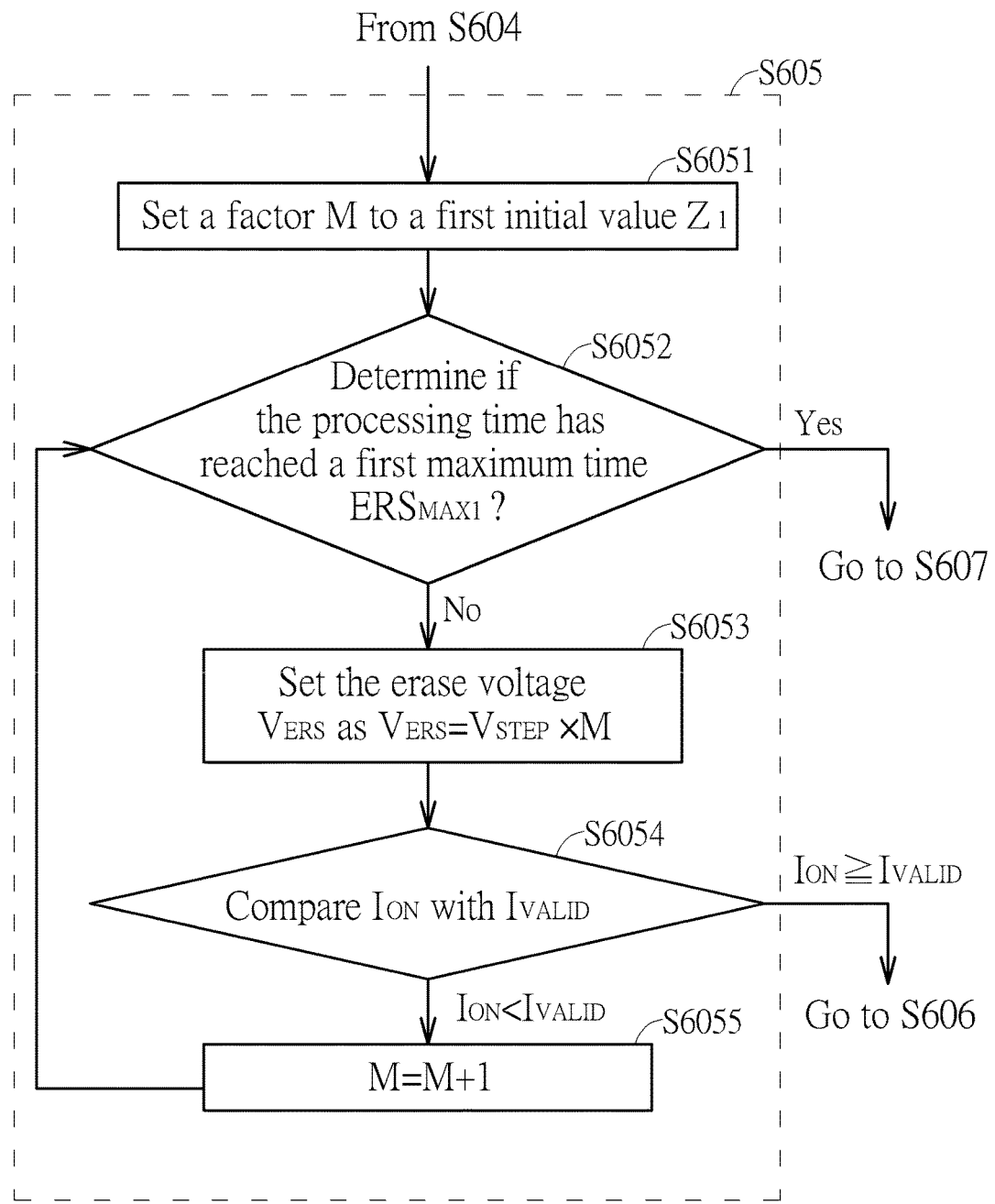
FIG. 9 illustrates a flow chart of step S605 in FIG. 8.

FIG. 9 illustrates a flow chart of step S605. Step S605 can be regarded as a step of performing the first loop. The first loop includes step S6051 to S6055. Any reasonable modification of step S6051 to step S6055 falls into the scope of the present invention. S6051 to step S6055 are illustrated below.

step S6051: set a factor M equal to a first initial value $Z_1$;
step S6052: determine if the processing time has reached a first maximum time $ERS_{MAX1}$; if the processing time has reached the first maximum time $ERS_{MAX1}$, go to step S607, else, go to step S6053;
step S6053: multiply a constant voltage $V_{STEP}$ by the factor M for generating the erase voltage $V_{ERS}$;
step S6054: compare the erase current $I_{ON}$ with the valid current $I_{VALID}$; if $I_{ON} \geq I_{VALID}$, go to step S606; if $I_{ON} < I_{VALID}$, go to step S6055;
step S6055: increment the factor M and go to step S6052.

Step S6051 to step S6055 differ from step S1051 to step S1055 in that the threshold voltage $V_{TH}$ is replaced with an erase current $I_{ON}$ and the valid voltage $V_{VALID}$ is replaced with a valid current $I_{VALID}$. Since the flow chart in FIG. 9 is similar to the flow chart in FIG. 2, detail illustrations are omitted here. Here, the constant voltage $V_{STEP}$ can be equal to 1.2 volts. The valid current $I_{VALID}$ can be equal to 45 uA (micro-amperes). Any reasonable parameter modification falls into the scope of the present invention.

Figure 10:
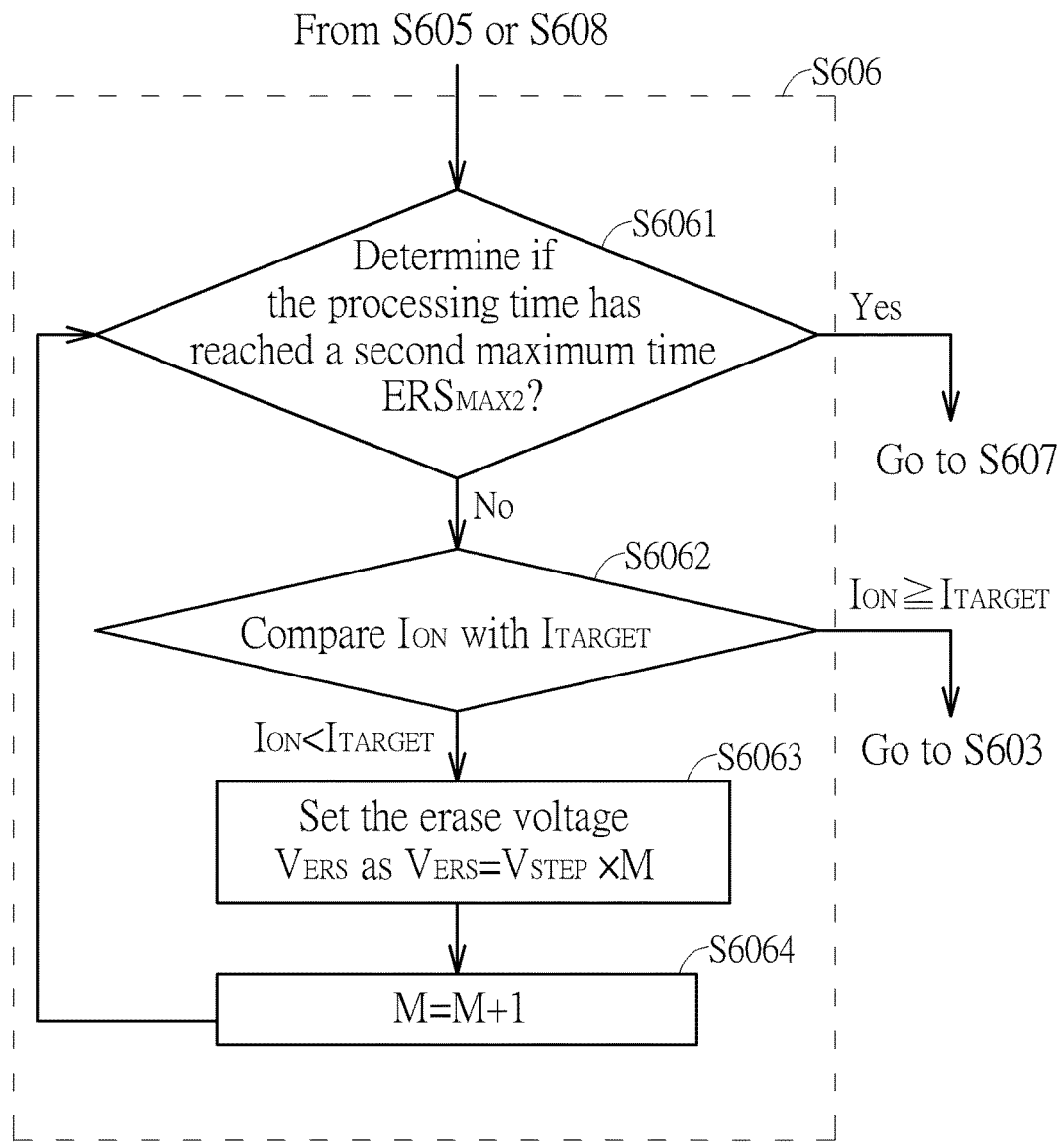
FIG. 10 illustrates a flow chart of step S606 in FIG. 8.

FIG. 10 illustrates a flow chart of step S606. Step S606 can be regarded as a step of performing the second loop. The second loop includes step S6061 to S6064. Any reasonable modification of step S6061 to step S6064 falls into the scope of the present invention. S6061 to step S6064 are illustrated below.

step S6061: determine if the processing time has reached a second maximum time $ERS_{MAX2}$; if the processing time has reached the second maximum time $ERS_{MAX2}$, go to step S607, else, go to step S6062;
step S6062: compare the erase current $I_{ON}$ with the target current $I_{TARGET}$; if $I_{ON} \geq I_{TARGET}$ go to step S603; if $I_{ON} < I_{TARGET}$, go to step S6063;
step S6063: multiply a constant voltage $V_{STEP}$ by a factor M for generating the erase voltage $V_{ERS}$;
step S6064: increment the factor M and go to step S6061.

Step S6061 to step S6064 differ from step S1061 to step S1064 in that the threshold voltage $V_{TH}$ is replaced with an erase current $I_{ON}$ and the target voltage $V_{TARGET}$ is replaced with the target current $I_{TARGET}$. Since the flow chart in FIG. 10 is similar to the flow chart in FIG. 3, detail illustrations are omitted here. Here, the constant voltage $V_{STEP}$ can be equal to 1.2 volts. The target current $I_{TARGET}$ can be equal to 90 uA. Any reasonable parameter modification or exchanging a processing sequence of step S6062 and S6063 falls into the scope of the present invention.

Figure 11:
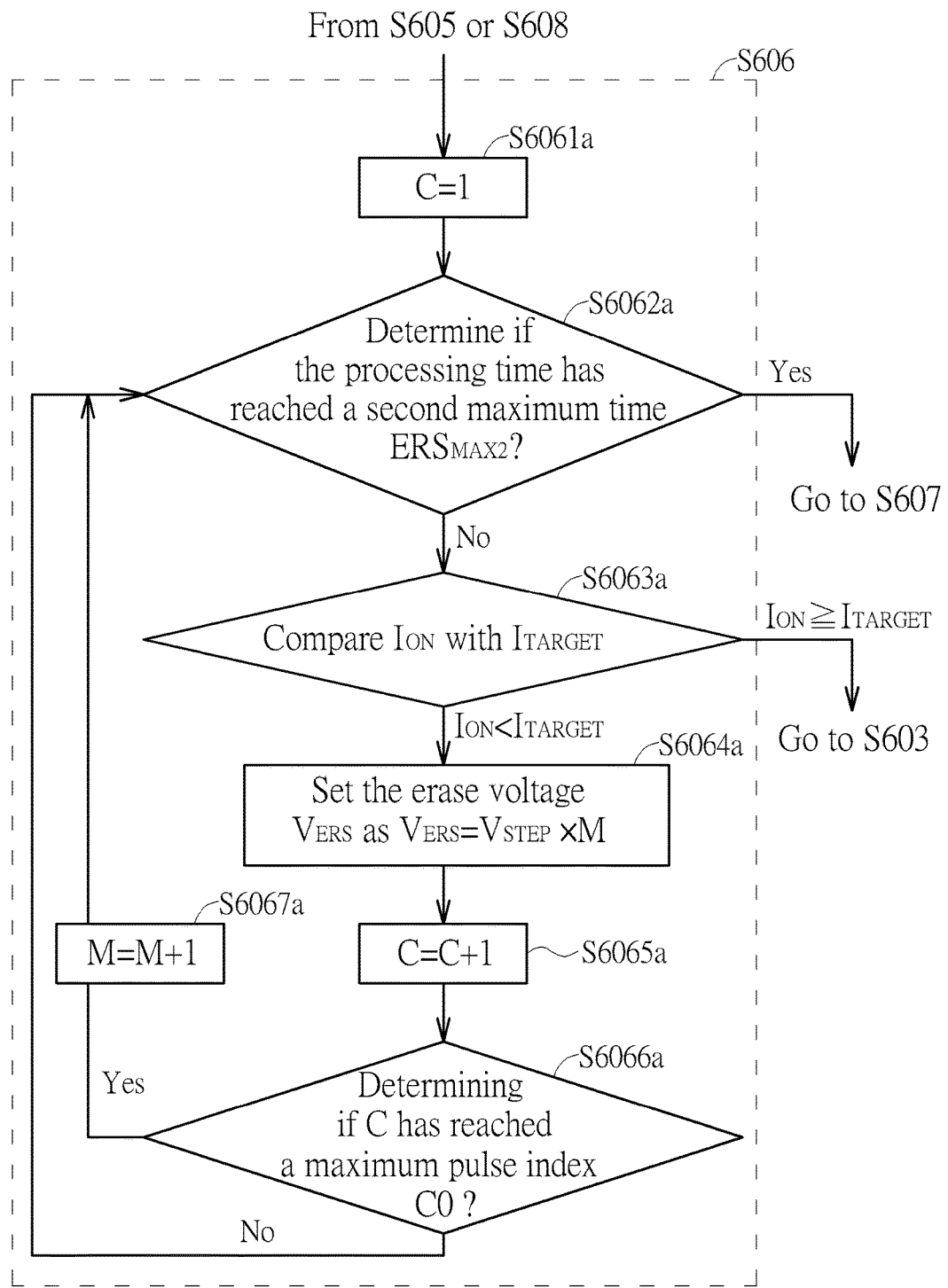
FIG. 11 illustrates another flow chart of step S606 in FIG. 8.

FIG. 11 illustrates another flow chart of Step S606. In FIG. 11, an additional dummy variable C is introduced (hereafter, say, "erase pulse index C") for applying to multi-erase pulses. Step S606 can be regarded as a step of performing the second loop. The second loop includes step S6061a to S6067a. Any reasonable modification of step S6061a to step S6067a falls into the scope of the present invention. S6061a to step S6067a are illustrated below.

step S6061a: set an erase pulse index C and its initial value;

step S6062a: determine if the processing time has reached a second maximum time $ERS_{MAX2}$; if the processing time has reached the second maximum time $ERS_{MAX2}$, go to step S607, else go to step S6063a;

step S6063a: compare the erase current $I_{ON}$ with the target current $I_{TARGET}$; if $I_{ON} \geq I_{TARGET}$, go to step S603; if $I_{ON} < I_{TARGET}$, go to step S6064a;

step S6064a: multiply a constant voltage $V_{STEP}$ by a factor M for generating the erase voltage $V_{ERS}$;

step S6065a: increment the erase pulse index C;

step S6066a: determine if the erase pulse index C has reached a maximum pulse index C0; if the erase pulse index C has reached the maximum pulse index C0, go to step S6067a; else go to step S6062a;

step S6067a: increment the factor M and go to step S6062a.

Step S6061a to step S6067a differ from step S1061a to step S1067a in that the threshold voltage $V_{TH}$ is replaced with an erase current $I_{ON}$ and the target voltage $V_{TARGET}$ is replaced with the target current $I_{TARGET}$. Since the flow chart in FIG. 11 is similar to the flow chart in FIG. 4, detail illustrations are omitted here. Similarly, the erase voltage $V_{ERS}$ can be a voltage of an envelope of erase pulses (i.e., erase pulse index C=1 to index C=C0). For example, the erase voltage $V_{ERS}$ can be a voltage of an envelope of 10 erase pulses (i.e., C0=10). The erase current $I_{ON}$ can be compared with the target current $I_{TARGET}$ after each program pulse is generated. However, the erase current $I_{ON}$ can also be compared with the target current $I_{TARGET}$ after consecutive C0 erase pulses. When the erase current $I_{ON}$ is greater than the target current $I_{TARGET}$, the second loop of step S606 is completed. However, the steps S6063a and S6064a can be exchanged. In other words, a comparison process in step S6063a can be executed before the erase voltage $V_{ERS}$ is generated in step S6064a. The comparison process can also be executed after the erase voltage $V_{ERS}$ is generated. Any reasonable modification or changing a sequence of steps S6063a and S6064a falls into the scope of the present invention. The erase operation is passed.

In the method for improving the erase speed previously mentioned, two different currents are used for quickly ramping-up the erase voltage $V_{ERS}$. In the embodiment, the valid current $I_{VALID}$ and the target current $I_{TARGET}$ can be regarded as two boundaries for detecting a range of the erase current $I_{ON}$. When the erase current $I_{ON}$ falls into a range of ($I_{ON} < I_{VALID}$) or ($I_{VALID} \leq I_{ON} < I_{TARGET}$), the erase voltage $V_{ERS}$ is ramped-up until the erase current $I_{ON}$ satisfies $I_{ON} \geq I_{TARGET}$. Thus, the erase speed can be improved.

In other words, the method for improving the program speed belongs to a method for ramping-up the program voltage according to a result of comparing the threshold voltage with at least two different voltages. The method for improving the erase speed belongs to a method for ramping-up the erase voltage according to a result of comparing the erase current with at least two different currents. Further, two loops can be introduced for facilitating high operational efficiency of the program operation or the erase operation. In the program operation, the first loop in FIG. 2 can be used. The second loop in FIG. 3 or the second loop in FIG. 4 can be used. Here, the second loop in FIG. 4 can be regarded as a specific version of the second loop in FIG. 3 by introducing an additional dummy variable C for performing voltage comparison after consecutive C0 program pulses are generated or after each program pulse is generated. However, the first loop can be reasonably modified to introduce the additional dummy variable C for specifying the program operation. Similarly, in the erase operation, the first loop in FIG. 9 can be used. The second loop in FIG. 10 or the second loop in FIG. 11 can be used. Here, the second loop in FIG. 11 can be regarded as a specific version of the second loop in FIG. 10 by introducing an additional dummy variable C for performing current comparison after consecutive C0 erase pulses are generated or after each erase pulse is generated. However, the first loop can be reasonably modified to introduce the additional dummy variable C for specifying the erase operation.

As previously mentioned, the aforementioned embodiments use the current-based comparison method for improving the erase speed of the memory. However, the voltage-based comparison method for improving the erase speed of the memory can also be used in the present invention. When the erase-based comparison method is used, "the erase level", "the valid level", and "the target level" can be regarded as "a threshold voltage", "a valid voltage", and "a target voltage". Specifically, the target voltage is smaller than the valid voltage. When the erase voltage $V_{ERS}$ is increased, the threshold voltage becomes small. Thus, in the voltage-based comparison method, the valid voltage and the target voltage can be regarded as two boundaries for detecting a range of the threshold voltage. When the threshold voltage is greater than the valid voltage or between the valid voltage and the target voltage, the erase voltage $V_{ERS}$ is ramped-up until the threshold voltage is smaller than or equal to the target voltage. Thus, the erase speed can be improved.

To sum up, the present invention discloses a method for improving the program speed and the erase speed of the memory. In the program operation, the valid voltage and the target voltage can be regarded as two boundaries for detecting a range of the threshold voltage. After the range of the threshold voltage is determined, the program voltage can be quickly ramped-up. Thus, the program speed can be improved. In the erase operation, the valid current and the target current can be regarded as two boundaries for detecting a range of the erase current. After the range of the erase current is determined, the erase voltage can be quickly ramped-up. Thus, the erase speed can be improved. Since the program speed and the erase speed of the memory can be improved, operation performance of the memory can be increased.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. A method for improving a program speed of a memory comprising:
   acquiring a program level of the memory;
   comparing the program level of the memory with a valid level and a target level for generating a comparison result; and
   entering a first loop and/or a second loop for setting a program voltage of the memory according to the comparison result;
   wherein entering the first loop for setting the program voltage comprises:
      updating the program voltage in associate with a factor according to comparing the program level of the memory with the valid level; and
   wherein entering the second loop for setting the program voltage comprises:
      updating the program voltage in associate with the factor according to comparing the program level of the memory with the target level.

2. The method of claim 1, wherein the program level of the memory cell is determined by a threshold voltage of the memory cell, and the target level is greater than the valid level.

3. The method of claim 1, wherein entering the first loop for setting the program voltage when the program level is smaller than the valid level.

4. The method of claim 1, wherein entering the second loop for setting the program voltage when the threshold level is between the valid level and the target level.

5. The method of claim 1, wherein updating the program voltage in associate with the factor according to comparing the program level of the memory with the valid level comprises:
   multiplying a constant voltage by the factor for generating the program voltage; and
   incrementing the factor when the program level is smaller than the valid level;
   wherein the program voltage is a voltage of a single pulse program signal or an envelope of program pulses.

6. The method of claim 1, wherein updating the program voltage in associate with the factor according to comparing the program level of the memory with the target level comprises:
   multiplying a constant voltage by the factor for generating the program voltage; and
   incrementing the factor when the program level is smaller than the target level;
   wherein the program voltage is a voltage of a single pulse program signal.

7. The method of claim 1, wherein updating the program voltage in associate with the factor according to comparing the program level of the memory with the target level comprises:
   multiplying a constant voltage by the factor for generating the program voltage; and
   incrementing the factor when the program level is smaller than the target level;
   wherein the program voltage is an envelope of program pulses.

8. The method of claim 1, further comprising:
   generating a program failure message when a processing time of the first loop or the second loop reaches a maximum time.

9. The method of claim 1, wherein when the program level is smaller than the valid voltage, enter the first loop for setting the program voltage so as to increase the program level to reach the valid level, and then enter the second loop for setting the program voltage so as to increase the program level to reach the target level.

10. The method of claim 1, wherein a first initial value of the factor in the first loop and a second initial value of the factor in the second loop are different two positive values.

11. The method of claim 1, wherein a first initial value of the factor in the first loop and a second initial value of the factor in the second loop are identical two positive values.

12. The method of claim 1, wherein the program level of the memory cell is determined by a cell current of the memory cell, and the target level is smaller than the valid level.

13. A method for improving an erase speed of a memory comprising:
   acquiring an erase level of the memory;
   comparing the erase level of the memory with a valid level and a target level for generating a comparison result; and
   entering a first loop and/or a second loop for setting an erase voltage of the memory according to the comparison result;
   wherein entering the first loop for setting the erase voltage comprises:
      updating the erase voltage in associate with a factor according to comparing the erase level of the memory with the valid level; and
   wherein entering the second loop for setting the erase voltage comprises:
      updating the erase level in associate with the factor according to comparing the erase level of the memory with the target level.

14. The method of claim 13, wherein the erase level of the memory cell is determined by a cell current of the memory cell, and the target level is greater than the valid level.

15. The method of claim 13, wherein entering the first loop for setting the erase voltage when the erase level is smaller than the valid level.

16. The method of claim 13, wherein entering the second loop for setting the erase voltage when the erase level is between the valid level and the target level.

17. The method of claim 13, wherein updating the erase voltage in associate with the factor according to comparing the erase level of the memory with the valid level comprises:
   multiplying a constant voltage by the factor for generating the erase voltage; and
   incrementing the factor when the erase level is smaller than the valid level;
   wherein the erase voltage is a voltage of a single pulse erase signal or an envelope of erase pulses.

18. The method of claim 13, wherein updating the erase voltage in associate with the factor according to comparing the erase level of the memory with the target level comprises:
   multiplying a constant voltage by the factor for generating the erase voltage; and
   incrementing the factor when the erase level is smaller than the target level;
   wherein the erase voltage is a voltage of a single pulse erase signal.

19. The method of claim 13, wherein entering the second loop for increasing the erase voltage according to the target level and the erase level comprises:

multiplying a constant voltage by the factor for generating the erase voltage; and incrementing the factor when the erase level is smaller than the target level;

wherein the erase voltage is an envelope of erase pulses.

20. The method of claim 13, further comprising:

generating an erase failure message when a processing time of the first loop or the second loop reaches a maximum time.

21. The method of claim 13, wherein when the erase level is smaller than the valid level, enter the first loop for setting the erase voltage so as to increase the erase level to reach the valid level, and then enter the second loop for setting the erase voltage so as to increase the erase level to reach the target level.

22. The method of claim 13, wherein a first initial value of the factor in the first loop and a second initial value of the factor in the second loop are different two positive values.

23. The method of claim 13, wherein a first initial value of the factor in the first loop and a second initial value of the factor in the second loop are identical two positive values.

24. The method of claim 13, wherein the erase level of the memory cell is determined by a threshold voltage of the memory cell, and the target level is smaller than the valid level.

* * * * *